United States Patent [19]

Champion et al.

[11] Patent Number: 5,140,090
[45] Date of Patent: Aug. 18, 1992

[54] ALIPHATIC POLYUREAS FROM POLYOXYALKYLENE POLYAMINES, ALIPHATIC DIISOCYANATES AND SYM-DIALKYLETHYLENEDIAMINES

[75] Inventors: Donald H. Champion, Pflugerville; George P. Speranza, Austin, both of Tex.

[73] Assignee: Texaco Chemical Company, White Plains, N.Y.

[21] Appl. No.: 712,817

[22] Filed: Jun. 10, 1991

[51] Int. Cl.5 ............... C08G 18/48; C08G 18/30
[52] U.S. Cl. ........................ 528/60; 528/61; 528/68; 521/163
[58] Field of Search ............... 528/60, 61, 68; 521/163

[56] References Cited

U.S. PATENT DOCUMENTS 4,705,814 11/1987 Grigsby et al. .............. 528/68
4,761,465 8/1988 Speranza et al. ............ 528/68

Primary Examiner—Maurice J. Welsh
Assistant Examiner—Rachel Johnson
Attorney, Agent, or Firm—Jack H. Park; Kenneth R. Priem; Cynthia L. Kendrick

[57] ABSTRACT

Disclosed is a method for preparing aliphatic polyureas in varying reaction times which comprises reacting polyoxyalkylene polyamines, an aliphatic diisocyanate and a sym-dialkylethylenediamine.

8 Claims, No Drawings

ALIPHATIC POLYUREAS FROM POLYOXYALKYLENE POLYAMINES, ALIPHATIC DIISOCYANATES AND SYM-DIALKYLETHYLENEDIAMINES

FIELD OF THE INVENTION

This invention relates to the reaction products of polyoxyalkylene polyamines, diisocyanates and sym-dialkylethylenediamines. More particularly, this invention relates to the preparation of aliphatic polyureas possessing a wide variation in properties which are useful in making fibers and hot melt adhesives.

The speed of reaction can be controlled by the selection of the dialkylethylenediamine.

BACKGROUND OF THE INVENTION

RIM products have been known in the art for a long time. Polyurethane materials were the first polymers to be used in the RIM process. Early systems consisted of polyether polyols, glycol chain extenders, catalysts and aromatic polyisocyanates. These systems exhibited problems such as low mold filling viscosity, long cycle times and the lack of a workable internal mold release capability.

The RIM materials which dominate the automotive market consist of polyether polyols, diamine chain extenders and aromatic polyisocyanates. These materials still suffer from relatively poor high temperature dimensional stability and internal release capabilities.

More recently RIM systems have been developed which consist of polyether polyamines, diamine chain extenders, such as DETDA and aromatic polyisocyanates. No catalysts are required in these RIM systems using polyether polyamines.

Representative patents describing the polyurea RIM systems include the following, assigned to Texaco Chemical Co.:

U.S. Pat. No. 4,297,444
U.S. Pat. No. 4,433,067
U.S. Pat. No. 4,444,910
U.S. Pat. No. 4,448,904
U.S. Pat. No. 4,474,900
U.S. Pat. No. 4,474,901
U.S. Pat. No. 4,487,908
U.S. Pat. No. 4,487,912
U.S. Pat. No. 4,499,254

U.S. Pat. Nos. 4,396,729; 4,444,910 and 4,433,067 concern elastomers prepared using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are left unreacted. Various patents have been applied for and received using this basic combination as well as various mold release agents and other additives.

It would be a substantial advance in the art if new methods were developed to alter the properties of RIM materials in predictable ways and to vary the rate of reaction.

SUMMARY OF THE INVENTION

In accordance with the foregoing the present invention describes the reaction of polyoxyalkylene polyamines, m-TMXDI and sym-dialkylethylenediamines to provide polyureas with widely varying properties. Meltable materials can be obtained and the speed of the reaction can be changed by using different dialkylethylenediamines. The materials can be used to make fibers or hot melt adhesives.

DESCRIPTION OF THE PREFERRED EMBODIMENTS

The reactants useful in the instant invention include a polyether polyamine, diisocyanate and dialkylethylenediamine.

The polyether polyamine starting materials for the present invention include polyoxyalkylene polyamines. The amine reactants may contain both ethylene oxide and propylene oxide and mixtures of from about 5 to about 95 wt % of ethylene oxide with, correspondingly, from about 95 to 5 wt % of propylene oxide. Where mixed propylene oxide/ethylene oxide polyols are employed, the ethylene oxide and propylene oxide may be premixed prior to reaction to form a heterocopolymer, or the ethylene oxide and the propylene oxide may be sequentially added to the ethoxylation kettle to form blocked oxypropylene/oxyethylene copolymers.

In general, the starting material may be defined as a polyoxyalkylene polyamine having the formula:

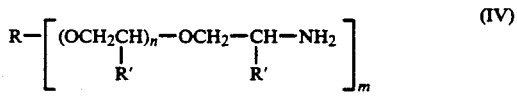

wherein R is the nucleus of an oxyalkylation-susceptible polyhydric alcohol containing 2 to 12 carbon atoms and 2 or 3 hydroxyl groups, R' is hydrogen or methyl, n is a number having an average value of 0 to 100, and m is an integer having a value of 2 to 3.

The polyoxyalkylene polyamine can alternatively be a polyoxypropylene triamine. In general, the average molecular weight of the polyoxypropylene triamine starting material will be from about 400 to about 5000. Examples of appropriate polyoxypropylene triamines that may be used as a starting material for the present invention include triamines sold by Texaco Chemical Company as JEFFAMINE ® T-series products having the formula:

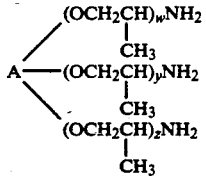

wherein A represents the nucleus of an oxyalkylation susceptible trihydric alcohol containing about 3 to about 6 carbon atoms, w, y and z are numbers and the average value of the sum of $w+y+z$ is from about 6 to about 100.

An example of such a product is a commercial product having an average molecular weight of about 400 wherein A represents a trimethylol propane nucleus, and the product contains about 5 to about 6 moles of propylene oxide (JEFFAMINE ® T-403 amine). Another is a product having an average molecular weight of about 5000 wherein A represents a glycerol nucleus and the product contains about 85 moles of propylene oxide (JEFFAMINE ® T-5000).

Another group of appropriate polyoxyalkylene polyamines that may be used are polyoxyalkylene diamines sold by the Texaco Chemical Company as JEFFAMINE ® D-series products having the formula:

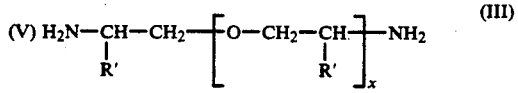

(III)

wherein R' independently represents methyl and x is a number having an average value of about 2 to about 70.

Representative products having this structural formula include polyoxypropylene diamines (wherein R' is methyl) having an average molecular weight of about 230 wherein the value of x is between 2 and 3 (JEFFAMINE ® D-230 amine), polyoxypropylene diamines having an average molecular weight of about 400 wherein x has a value between about 5 and 6 (JEFFAMINE ® D-400 amine), a polyoxypropylene diamine product having an average molecular weight of about 2000 wherein x has a value of about 33 (JEFFAMINE ® D-2000 amine), and a product having an average molecular weight of about 4000 wherein x has a value of about 60 (JEFFAMINE ® D-4000 amine).

It can be observed from Examples 10 through 19 that polytetrahydrofurans can be substituted for polyoxyalkylene polyamines in the method of the instant invention. Polytetrahydrofurans with suitable properties include aminated polytetrahydrofuran as disclosed, for example, in U S. Pat. No. 5,003,107, and incorporated herein by reference, and α, ω-bis(3-aminopropyl)-polytetrahydrofuran.

In general, the isocyanates which can be used include aliphatic isocyanates. Examples include tetramethylxylene diisocyanate and isophorone diisocyanate. Good results were obtained using α,α,α,α-tetramethyl-m-xylene diisocyanate. This material is produced by American Cyanamid under the trade name m-TMXDI.

In previous work in the field either a catalyst and/or a long reaction time and/or heat were generally required in manufacturing reaction products of polyols and isocyanates.

Polyoxyalkylene polyamines are very reactive with isocyanates and unlike the reaction between polyols and isocyanates, no heat or catalyst is required to carry out the reaction between polyoxyalkylene polyamines and isocyanates. Since the reaction between polyoxyalkylene polyamines and isocyanates takes place quickly and without the addition of a catalyst, it is necessary to provide methods which will encourage the uniform mixing at a rate as fast as or faster than the rate at which the reaction is taking place to promote uniform mixing and uniform reaction throughout the mixture. If a vessel is used to provide mixing with a moving or static mechanical stirrer, then the stirring must be at such a rate to provide this uniform and speedy mixing so that the reaction will be homogeneous throughout the mixture. The stirring may also be done by other means known to those skilled in the art such as impingement mixing. In impingement mixing two or more streams are impacted at a high velocity and the resulting turbulence provides intimate mixing very rapidly. Impingement mixing is known to those skilled in the art and, as is known to those in the field of reaction injection molding, the head of a RIM machine relies on impingement mixing to mix reactants together.

Depending on the type of polyoxyalkylene polyamine and the type of isocyanate, the speed of mixing necessary to provide the uniform homogeneous reaction would vary. For example, in the case of a typical aliphatic diisocyanate reacted with a polyoxyalkylene polyamine, the reaction rate, although fast, might be slow enough to allow mechanical mixing means such as stirrers to be used if desired. Stirring may be faciliated by raising the reaction and subsequent stirring temperature if the polyurea formed is meltable. However, where the reaction takes place at a very rapid rate, normal mixing means such as stirrers may not be practical since they cannot mix the two components rapidly enough to avoid non-homogeneous reaction phases in the final product. In this case the impingement mixing technique or a mixing technique known to those skilled in the art which is at least as rapid and thorough as impingement mixing might need to be used in order that the final product be mixed rapidly and in such a homogeneous manner that the final reacted product is uniform throughout.

When an amount of active hydrogen-containing material, whether it be polyol or polyoxyalkylene polyamine, is used which is less than half the stoichiometric amount needed to react with the isocyanate present, the product is generally called a quasi-prepolymer. When the reaction product consists of one half the stoichiometric amount of active hydrogen material and isocyanate, the product is generally called a prepolymer. These materials are useful for the manufacture of plastics called polyurethanes if the final plastic contains only hydroxyl-isocyanate linkages, polyurea/polyurethane if they contain both hydroxyl-isocyanate linkages and amine-isocyanate linkages or polyurea products if they contain only amine-isocyanate linkages.

When used to manufacture the above-mentioned polyurethane and/or polyurea plastics, it is necessary to further react the quasi-prepolymers with additional active hydrogen-containing material, including but not limited to polyoxyalkylene polyamines, polyols and chain extenders. The products that may be made are known in the art and include products ranging from flexible foams to cast and RIM elastomers or rigid foams and other variations. These products and their manufacture are known to those skilled in the art.

Additional ingredients which may be used if desired for specific applications include blowing agents, catalysts, fillers, coloring agents and surfactant materials.

In the preparation of polyurea RIM in general, chain extenders are desirable and are incorporated into the reaction between the quasi-prepolymer and either polyols or polyoxyalkylene polyamines of high molecular weight. Generally hydroxyl-containing chain extenders such as ethylene glycol, 1,4-butane diol and the like may be used. Also useful are aromatic diamine chain extenders and aliphatic chain extenders, for example, as described in U.S. Pat. Nos. 4,246,363 and 4,269,945.

In the instant invention it has been discovered that certain sym-dialkylethylenediamines added to a quasi-prepolymer or isocyanate and polyamine allow for variation in the properties of the product and variation in the speed of reaction. The sym-dialkylethylenediamines which work in the invention are those in which the alkyl group contains 1 to 3 carbons. Suitable sym-dialkylethylenediamines include sym-dimethylethylenediamine (DMEDA), diethylethylenediamine (DEEDA), sym-diisopropylethylenediamine (DIPEDA) and sym-di-n-propylethylenediamine.

The reaction can take place at ambient temperatures. Where some heat is desirable, the temperature should preferably not exceed 250° C.

It can be observed from Example I, that use of DMEDA results in a very hard composition which forms a bond between two aluminum surfaces and the bond cannot be separated by hand. DEEDA allowed for the formation of a mixture from which flexible fibers could be pulled for about a minute before the composition hardened.

DIPEDA provided a product with properties similar to those of DEEDA in Example 2 and sym-di-t-butylethylenediamine (DTBEDA) gave a tacky and soft product which did not give a permanent bond between aluminum surfaces or possess the capability of fiber formation. In addition, as the data in Tables I through IV indicate different combinations of various polyetherpolyamines and sym-dialkyletheylenediamines provide variations in gel time.

Those skilled in the art will see the advantages inherent in the method of the instant invention. The following examples are given in the way of illustration and are not intended to limit the invention in any way.

EXAMPLE 1

To 27.73 (71.5 meq) of a quasi-prepolymer prepared from 40 parts m-TMXDI and 60 parts polyoxypropylenediamine of molecular weight 2000 (JEFFAMINE ® D-2000) was added 3.00 g (68.1 meq) sym-dimethylethylenediamine (DMEDA). On mixing, the reactants gelled. The mass was remelted in a 150° C. oven, applied between two aluminum strips and clamped to give a ½" overlap. On cooling a bond formed which could not be separated when pulled by hand.

EXAMPLE 2

The reaction of Example 1 was repeated substituting sym-diethylethylenediamine (DEEDA) for DMEDA and adjusting the mass of isocyanate to the equivalent weight of DEEDA. Mixing of the reactants was accomplished by hand and weak but flexible fibers could be pulled from the mixture for about 1 minute after mixing. Bonding to aluminum plates was accomplished as in Example 1 to give the same results.

Reaction of sym-diisopropyl- and sym-di-t-butylethylenediamines (DIPEDA and DTBEDA, respectively) were similarly carried out. The former gave results parallel to Example 2, while the latter gave a tacky and soft product which did not give a permanent bond between aluminum surfaces or possess the capability of fiber formation. Table I summarizes the results of these examples.

TABLE I

Aliphatic Polyureas from sym-Dialkylethylenediamines

| EXAMPLE | Components, g | | | |
|---|---|---|---|---|
| | 1 | 2 | 3 | 4 |
| 40/60 m-TMXDI/ D-2000 Quasi 2.577 meq/g | 27.73 | 26.65 | 25.98 | 25.06 |
| DMEDA 22.689 meq/g | 3.00 | | | |
| DEEDA 17.21 meq/g | | 3.80 | | |
| DIPEDDA 13.86 meq/g | | | 4.60 | |
| DTBEDA 11.606 meq/g | | | | 5.30 |
| approximate gel time* | on mixing | 1 min | 2-6 min | >50 min |

*time at which fibers could be drawn

EXAMPLES 5-9

Several other reactions were carried out in a smaller manner using m-TMXDI and polyoxypropylene polyamines instead of quasi-prepolymers. All polyureas contained 55% by weight hard block (DIPEDA+m-TMXDI wt %). The preparations described in Examples 6 and 8 caused fast reactions which did not allow fibers to be pulled. The products were placed in a 150° C. oven; products from Examples 5 and 9 melted while that from Example 8 did not. Products of Examples 6 and 7 partially melted at 150° C.

TABLE II m-TMXDI/Polyoxypropylene Polyamine/DIPEDA Polyurea

| EXAMPLE | Components, g | | | | |
|---|---|---|---|---|---|
| | 5 | 6 | 7 | 8 | 9 |
| m-TMXDI 8.187 meq/g | 7.33 | 10.48 | 9.04 | 9.67 | 7.18 |
| DIPEDA 13.86 meq/g | 3.68 | 0.51 | 1.98 | 1.33 | 3.82 |
| D-2000 1.00 meq/g | 9.00 | | | | |
| D-230 8.75 meq/g | | 9.00 | | | |
| D-400 5.17 meq/g | | | 9.00 | | |
| T-403 6.75 meq/g | | | | 9.00 | |
| T-5000 0.65 meq/g | | | | | 9.00 |
| gel time | 3 min | fast | 2.8 min | fast | >1 min |

EXAMPLES 10-13

Several polyureas were prepared using α,ω-bis(3-aminopropyl)polytetrahydrofurans in place of the polyoxypropylene polyamines. Results are summarized in Table III. Products from Examples 11-13 melted in a 150° C. oven, while that from Example 10 did not.

TABLE III m-TMXDI/Bis(aminopropyl)poly(THF)/DIPEDA Polyurea

| EXAMPLE | Components, g | | | |
|---|---|---|---|---|
| | 10 | 11 | 12 | 13 |
| m-TMXDI 8.187 meq/g | 10.88 | 7.56 | 7.13 | 6.76 |
| DIPEDA 13.86 meq/g | | 2.43 | 2.87 | 3.24 |
| Bis(aminopropyl)poly(THF) | | | | |
| Mw 204 9.790 meq/g | 9.10 | | | |
| Mw 750 2.824 meq/g | | 10.00 | | |
| Mw 1100 1.861 meq/g | | | 10.00 | |
| Mw 2100 1.042 meq/g | | | | 10.00 |
| % hard block | 54.46 | 49.98 | 50.00 | 49.99 |
| gel time | fast | 4 min | 3:15 | 2:30 |

EXAMPLES 14-19

Polyureas containing amines obtained by the direct amination of poly(tetrahydrofuran), poly(THF), were prepared in an analogous fashion. The products from Examples 16–18 melted in a 150° C. oven, while those from Examples 14, 15 and 19 partially melted. Methanol dissolved the products from Examples 17 and 18 and caused the other products to swell. The product from Example 19 could not be broken by repeated blows with a hammer at room temperature.

TABLE IV m-TMXDI/Aminated Poly(THF)/DIPEDA Polyureas

| | Components, g | | | | | |
|---|---|---|---|---|---|---|
| EXAMPLE | 14 | 15 | 16 | 17 | 18 | 19 |
| m-TMXDI 8.187 meq/g | 12.16 | 10.25 | 7.54 | 7.15 | 6.71 | 7.01 |
| DIPEDA 13.86 meq/g | | | 2.47 | 2.84 | 3.29 | 3.00 |
| DBGDA[a] 12.6 meq/g | 7.90 | | | | | |
| TBGDA[b] 8.56 meq/g | | 9.80 | | | | |
| Aminated Poly(THF) | | | | | | |
| 6374-79[c] 2.751 meq/g | | | 10.00 | | | |
| 6374-63-2[d] 1.919 meq/g | | | | 10.00 | | |
| 6374-83-3[e] 0.933 meq/g | | | | | 10.00 | |
| 6640-14[f] 1.58 meq/g | | | | | | 10.00 |
| % hard block | 60.6 | 51.1 | 50.0 | 50.0 | 50.0 | 50.0 |
| gel time, min | fast | fast | 1.0 | 2.5 | 1.5 | fast |

[a] Dibutyleneglycol Diamine
[b] Tributyleneglycol Diamine
[c] Aminated Mw 650 Poly(THF)
[d] Aminated Mw 1000 Poly(THF)
[e] Aminated Mw 2000 Poly(THF)
[f] Aminated Mw 1000 Poly(THF) containing a high secondary amine content.

EXAMPLES 20–22

D-2000/m-TMXDI/DIPEDA polyureas were prepared at different hard block contents as shown in Table V. All were subsequently placed in a 125° C. oven for 1 hour at which temperature all were molten. The product from Example 20 was soft and flexible at room temperature and crept slowly. A tough and flexible article was obtained from Example 21. A hard and brittle material was obtained from Example 22.

TABLE V m-TMXDI/D-2000/DIPEDA Polyurea

| | Components, g | | |
|---|---|---|---|
| Example | 20 | 21 | 22 |
| m-TMXDI | 4.40 | 6.74 | 9.10 |
| DIPEDA | 1.59 | 3.26 | 4.94 |
| D-2000 | 14.00 | 10.00 | 6.00 |
| % hard block | 30.0 | 50.0 | 70.1 |

EXAMPLE 23

A three necked flask fitted with a mechanical stirrer, thermometer, nitrogen inlet and addition funnel was charged with 16.3 g (226 meq) DIPEDA and 50.0 g (50.0 meq) D-2000. To this mixture was added 33.7 g (276 meq) m-TMXDI dropwise at 26° to 110° C. The temperature rose during the addition and was further increased by heating in order to lower the viscosity of the reacting mass. The mixture was subsequently heated to 153° C. for 1 hour and poured onto aluminum foil coated with mold release agent to give an off white and slightly brittle elastomer. Testing of the product as an adhesive was carried out by melting it onto aluminum plates in a 150° C. oven and pressing the plates together in a clamp according to ASTM D-b 1002 and D-1876 to give values of 1140 lb/in$^2$ (tensile sheer) and 3.4 pli (T-peel).

What is claimed is:

1. A method for preparing aliphatic polyureas which comprises reacting polyoxyalkylene polyamines, an aliphatic diisocyanate and a sym-dialkylethylenediamine where the alkyl group has 1 to 3 carbon atoms.

2. The method of claim 1 wherein the polyoxyalkylene polyamine is a polyetherpolyamine of the formula:

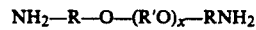

where R and R' are the same or different $C_2$–$C_4$ alkylene and x is 2 to 33.

3. The method of claim 2 wherein the polyoxyalkylene polyamine is a polyoxypropylene diamine having the formula:

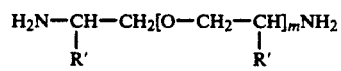

wherein R' independently represents methyl and m is about 33.

4. The method of claim 1 wherein the aliphatic diisocyanate is m-tetramethylxylene diisocyanate.

5. The method of claim 1 wherein the sym-dialkylethylenediamine is selected from the group consisting of sym-dimethylethylenediamine, sym-diethylethylenediamine and sym-diisopropylethylenediamine.

6. A method for preparing aliphatic polyureas which comprises reacting a polyoxypropylene diamine, m-tetramethylxylene diisocyanate and a sym-dialkylethylenediamine where the alkyl group contains 1 to 3 carbon atoms at a pressure of from atmospheric to about 250 psig and a temperature of ambient to about 250° C.

7. The method of claim 6 wherein the sym-dialkylethylenediamine is sym-diisopropylethylenediamine.

8. A method for preparing aliphatic polymers which comprises reacting a polyoxypropylene triamine, m-tetramethylxylene diisocyanate and a sym-dialkylethylenediamine where the alkyl group contains 1 to 3 carbon atoms at a pressure of from atmospheric to about 250 psig and a temperature of ambient to about 250° C.

* * * * *